Oct. 24, 1933.　　　P. J. DONAVAN　　　1,932,287

BRAKE TESTING APPARATUS

Filed Nov. 14, 1927

INVENTOR:
Paul J. Donovan

BY

ATTORNEY

Patented Oct. 24, 1933

1,932,287

UNITED STATES PATENT OFFICE 1,932,287

BRAKE-TESTING APPARATUS

Paul J. Donavan, Los Angeles, Calif., assignor, by mesne assignments, to Bendix-Cowdrey Brake Tester, Inc., Fitchburg, Mass., a corporation of Delaware Application November 14, 1927
Serial No. 233,059

8 Claims. (Cl. 265—25)

This invention relates to an apparatus for testing vehicle brakes.

An object of the present invention is to provide an apparatus for testing vehicle brakes by supporting and revolving a wheel provided with a brake and measuring the resistance of the brake to rotation of the wheel.

More particularly an object of the present invention is to provide a simple brake testing apparatus, characterized by the use of a movably mounted reduction gear box adapted to perform both the function of driving the apparatus from a small motor and also the function of indicating the resistance to such motion.

Various further objects and advantages of the present invention will be apparent from a description of the preferred form or example of a brake testing apparatus embodying the invention. For this purpose, there is hereinafter described the preferred form of apparatus, the description being given in connection with the accompanying drawing, in which.

Figure 1:
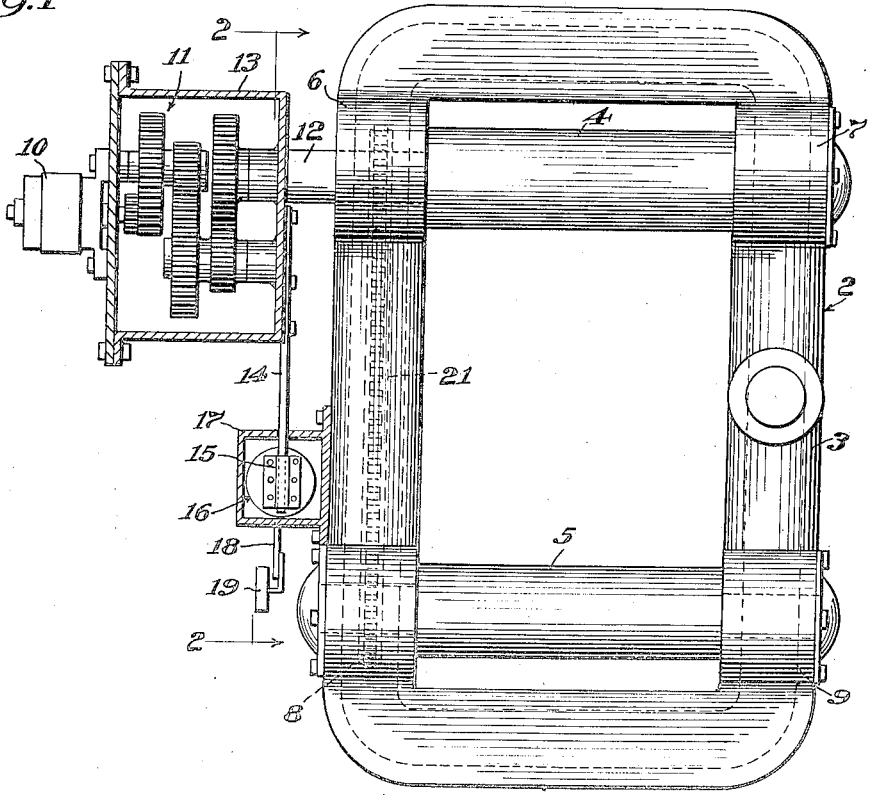
Figure 1 is a plan view of the brake testing apparatus partially in section.
Figure 2:
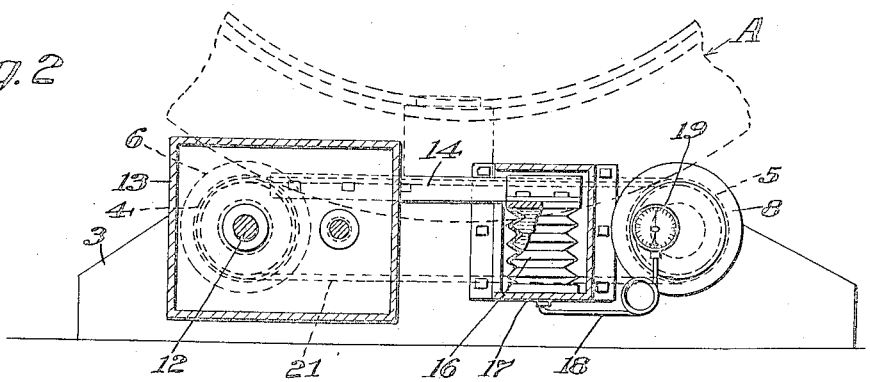
Figure 2 is a section on the irregular line 2—2 of Figure 1.

Referring to the drawing,—the apparatus comprises a means for supporting and revolving a vehicle wheel, the brake of which is to be tested. In the drawing A indicates such a vehicle wheel and 2 indicates the supporting and revolving means for said wheel, the same being shown as comprising a frame 3 and a pair of horizontally spaced apart rollers 4 and 5. The roller 4 is indicated as journalled at its ends in the bearings 6 and 7 of the frame 3 and the roller 5 is indicated as journalled at its ends in the bearings 8 and 9. The frame 3 is preferably of just a height sufficient to support the rollers 4 and 5 in an elevated position, the frame being constructed as low as possible in order that a vehicle may be readily run upon the testing apparatus.

There is associated with the wheel support and revolving means 2 a means or mechanism for turning the roller 4 of the supporting and revolving means. Said means is illustrated as comprising an electrical motor 10 connected by a reduction gearing 11 to a shaft 12 mounting the roller 4. The reduction gearing 11 is indicated as mounted within a gear box 13 and said gear box is indicated as movably mounted in the apparatus. Preferably the gear box is entirely supported by the shaft 12 and free to revolve thereabout. The motor 10 is indicated as preferably supported or mounted on the gear box 13 and the gear box 13 is indicated as being connected or provided with a means for indicating during operation the torque tending to revolve the gear box about the supporting shaft 12. A preferred form of said means is indicated as including an arm 14 attached to the gear box at one end and having its opposite end engaging, as indicated at 15, the upper end of a resilient bellows 16. The bellows 16 is indicated as mounted by a bracket 17 to the side of the frame 3 of the testing apparatus and the lower end of the bellows is indicated as connected by a pipe 18 to a pressure gauge 19.

While it is necessary in the testing apparatus to drive only the roller 4, I have shown the roller 4 as connected with the roller 5 by a chain 21 so that the roller 5 will also be driven in operation. This is to cause both rollers to exert a rotating force upon the wheel A.

Figure 3:
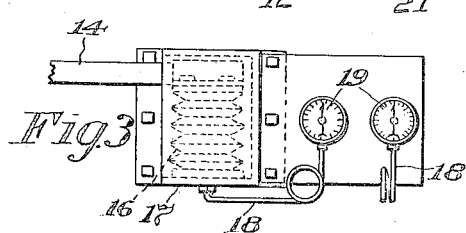
Fig. 3 is a side elevation of part of the brake tester of Fig. 2 and shows a controlling board having a pair of pressure gages mounted thereupon.

In use of the present testing apparatus the vehicle is driven into position to cause one of its wheels to be supported upon the testing apparatus. In certain cases it may be desirable to test all of the wheels of the vehicle which are provided with brakes in which case a similar apparatus may be placed under each of the wheels to be tested. The testing operations are then conducted by actuating the electric motor 10 to drive the roller 4 thereby turning the vehicle wheel A. Whenever the brake upon said vehicle wheel is applied to the wheel a resulting torque is placed on the shaft 12 proportional to the braking action. This torque is reflected by a force in the reduction gearing 11 tending to revolve the gear box 13 around its supporting shaft 12. This rocking movement of gear box 13 causes the arm 14 to press down on the bellows 16 with the result that the pressure gauge 19 will indicate the braking action applied to the wheel A. While in its broader form the invention includes the use of any indicating apparatus for indicating the torque on the gear box 13, the use of the bellows and gauge as an indicator is of particular advantage in a brake testing device of this kind inasmuch as it frequently occurs that comparative readings are desired between the braking actions on a number of vehicle wheels at the same time. With the apparatus of the present invention the pressure gauges 19 of a number of like testers may all be mounted upon a single control board as shown in Fig. 3 so that a side by side comparison may be made between the braking action on different vehicle wheels.

While the particular form of the invention herein described is well adapted to carry out the objects of the present invention, it is to be understood that various modifications and changes may be made without departing from the invention, and the invention includes all such modifications and changes as come within the scope of the following appended claims.

I claim:

1. A brake tester for testing the action of a brake upon a wheel of an automobile, comprising, means for supporting and for rotating a wheel of an automobile under brake resistance, a train of gears for driving said means, a box containing said gears a motor on the box for driving said gears, said box mounted for rocking movement in response to variations in the turning force transmitted by the gears, a resilient bellows, a connection for subjecting the bellows to the force tending to rock the box, and a pressure gage operable by the bellows to indicate the turning force applied to said wheel.

2. A brake tester for testing the action of a brake upon a wheel of an automobile, comprising, means for supporting and for rotating a wheel of an automobile under brake resistance, planetary gearing for driving said means, a housing for the planetary gearing, a motor on the housing for driving the planetary gearing, said housing mounted for rocking movement in response to variations in the turning force transmitted to said wheel supporting and rotating means, and means for indicating the turning force applied to the automobile wheel including a resilient bellows adapted to be actuated by the movement of said rocking element and a pressure gage operable by the bellows.

3. A brake tester for testing the action of a brake upon a wheel of an automobile, comprising, a supporting frame having mounted thereupon a pair of rollers adapted to support and to rotate a wheel of an automobile under brake resistance, a housing rockable on the shaft of one of the rollers, a motor supported on the housing, a driving connection in the housing between the motor and said rollers, and means for indicating the turning force imparted to the automobile wheel by the rollers including a resilient bellows adapted to be actuated by the movement of said rocking element and a pressure gage operable by the bellows.

4. A brake tester for testing the action of a brake upon a wheel of an automobile, comprising, means for supporting and for rotating a wheel of an automobile under brake resistance, a train of gears for driving said means including a gear supported for rocking movement in response to variations in the turning force imparted to the wheel a housing for the train of gears, a motor on the housing for driving the train of gears, a resilient bellows, a connection between the housing and bellows for submitting the latter to the force tending to move the rocking gear, and a pressure gage operable by the bellows to indicate the turning force imparted to the automobile wheel.

5. A brake tester for testing the action of a brake upon a wheel of an automobile, comprising, means for supporting and for rotating a wheel of an automobile under brake resistance, a train of gears for driving said means, a gear box containing said gears and mounted for rocking movement in response to variations in the turning force transmitted by the gears, a motor mounted on the rocking gear box eccentrically relative to the wheel supporting and rotating means to drive the gears, a resilient bellows, a connection for subjecting the bellows to the rocking force action on the gear box, and a pressure gage operable by the bellows to indicate the turning force applied to said wheel.

6. A unit of the character described comprising a stationary support, a driving means for acting upon a work receiving device and including a drive shaft journalled in said support, means pivotally mounted on said shaft including an arm, mechanism to drive said shaft mounted on said means, gearing connecting said shaft and mechanism, means interposed between said support and said arm and yieldably restraining the swinging of said arm, and means controlled by the restraining means to indicate the restraining effort exerted on said arm.

7. A unit of the character described comprising a stationary support, a driving means for acting upon a work receiving device and including a drive shaft journalled in said support, means pivotally mounted on said shaft including an arm, mechanism to drive said shaft mounted on said means, gearing connecting said shaft and mechanism, hydraulic means interposed between said support and said arm and yieldably restraining the swinging of said arm, and means to indicate the hydraulic pressure in said means and thereby the restraining effort exerted on said arm.

8. A unit of the character described comprising a stationary support, a driving means for acting upon a work receiving device and including a direct drive shaft journalled in said support, means pivotally mounted on said shaft including an arm, a motor mounted on said means, gearing connecting said shaft and motor, hydraulic means interposed between said support and said arm and yieldably restraining the swinging of said arm, said means including a pressure chamber, and means to measure hydraulic pressure in said hydraulic means and thereby the restraining effort exerted on said arm.

PAUL J. DONAVAN.